US008397226B2

(12) United States Patent  
Meijer et al.

(10) Patent No.: US 8,397,226 B2  
(45) Date of Patent: Mar. 12, 2013

(54) PATTERN MATCHING OVER STRUCTURED LITERALS

(75) Inventors: Henricus Johannes Maria Meijer, Mercer Island, WA (US); Brian C. Beckman, Newcastle, WA (US)

(73) Assignee: Microsoft Corporation, Redmond, WA (US)

( * ) Notice: Subject to any disclaimer, the term of this patent is extended or adjusted under 35 U.S.C. 154(b) by 1735 days.

(21) Appl. No.: 11/504,289

(22) Filed: Aug. 14, 2006

(65) Prior Publication Data

US 2008/0127068 A1 May 29, 2008

(51) Int. Cl.  
*G06F 9/44* (2006.01)

(52) U.S. Cl. .......................... 717/162; 717/165

(58) Field of Classification Search .................. None  
See application file for complete search history.

(56) References Cited

U.S. PATENT DOCUMENTS

| | | | | |
|---|---|---|---|---|
| 5,333,283 | A | 7/1994 | Emma et al. | 395/375 |
| 5,627,748 | A | 5/1997 | Baker et al. | 395/792 |
| 6,487,566 | B1 | 11/2002 | Sundaresan | 707/513 |
| 6,683,624 | B1 | 1/2004 | Pazel et al. | 345/763 |
| 6,782,532 | B1 | 8/2004 | Sexton et al. | 717/136 |
| 7,543,015 | B2 * | 6/2009 | Vion-Dury et al. | 709/200 |
| 2004/0194057 | A1 | 9/2004 | Schulte et al. | 717/114 |
| 2005/0131875 | A1 | 6/2005 | Riccardi et al. | 707/3 |
| 2005/0132342 | A1 | 6/2005 | Van Lunteren | 717/143 |
| 2008/0065596 | A1 * | 3/2008 | Shadmon et al. | 707/2 |
| 2008/0263039 | A1 * | 10/2008 | Van Lunteren | 707/6 |

FOREIGN PATENT DOCUMENTS

WO  WO 03/067391 A2  8/2003

OTHER PUBLICATIONS

Suciu, "Semistructured data and XML," Citeseer, 1998.*  
Odersky, "An Overview of the Scala Programming Language," Citeseer, 2004.*  
Von Burak Emir, "Extending Pattern Matching with Regular Tree Expressions for XML Processing in SCALA", Apr. 2003, http://lampwww.epfl.ch/~buraq/written/DiplomaThesis.ps.gz, 83 pages.  
Lee, K. et al., "HydroJ: Object-Oriented Pattern Matching for Evolvable Distributed Systems", *OOPSLA*, 2003, 205-223, http://delivery.acm.org.  
Meijer, E. et al., "*Haskell Server Pages* Functional Programming and the Battle for the Middle Tier", *Electronic Notes in Theoretical Computer Science*, 2001, 41(1), 24 pages, http://research.microsoft.com/~emeijer/Papers/HSP.pdf.

* cited by examiner

Primary Examiner — Insun Kang  
(74) Attorney, Agent, or Firm — Woodcock Washburn LLP

(57) ABSTRACT

A computer programming language, computer-readable medium and method for pattern matching over structured literals (e.g., XML literals, object literals, type literals, code literals, etc.). The programming language may have a pattern defined in an object-oriented programming language. The pattern may be a structured literal that is capable of matching a value contained in an incoming data stream. The structured literal may include one or more variables, which may be bound to the value if the pattern matches the value.

8 Claims, 3 Drawing Sheets

PATTERN MATCHING OVER STRUCTURED LITERALS

BACKGROUND

Most object-oriented languages have some form of switch statement that allows the value of data to influence the control flow of a program. The following is an example switch statement in a Visual Basic program:

```
Dim N As Integer
...
Select N
    Case 1 To 5
        ... statement executed when N is 1, 2, 3, 4, or 5 ...
    Case 6, 7, 8
        ... statement executed when N is 6, 7, or 8 ...
    Case Else
        ... default branch
End Select
```

As illustrated above, the values in the branches of the switch statement are usually limited to types that have numbers, Booleans, and/or strings as literals. Thus, in most object-oriented languages, such as Visual Basic, for example, only simple (i.e., non-structured) types may have literals.

Functional languages, such as Haskell and Service Modeling Language (SML), generalize such switch statements by using pattern matching as a convenient notation to bind variables based on the structure of incoming data. This is possible because functional languages typically support literals for structured types, such as lists, trees, and the like. For example, the statement below performs a pattern match on the argument list xs, checking to determine whether it is either empty [ ], or of the form y:ys, in which case it binds y to the head (hd xs) of the list and ys to the tail (tl xs) of the list:

length::[a]->Int
length xs=
  case xs of
    [ ]->0
    (y:ys)->1+length ys

In this example, the values have structure. Accordingly, instead of switching only on constants (i.e., non-structured types), switching may also occur on structured values. In addition, substructures may also be bound to variables. By contrast, where pattern matching is performed on non-structured type literals, there is nothing to bind. A variable may be bound when the variable is given a value. Thus, a variable may have a name, type, and, if bound, a value.

The expressiveness of pattern matching may be derived from the fact that the compiler may perform extensive rewriting on the source code to extract the matched values, binding them to the indicated variables, while maintaining the correct branching control structure. With the introduction of structured literals (e.g., XML literals, object literals, type literals, etc.) into various object-oriented and functional programming languages, it would be desirable to use structured literals to implement pattern matching in these programming languages.

SUMMARY

The described embodiments contemplate a computer programming language, computer-readable medium and method for pattern matching over a structured literal. The programming language may have a first pattern defined in an object-oriented programming language. The first pattern may be a structured literal (e.g., an XML literal, object literal, type literal, code literal, etc.) that is capable of matching a value contained in an incoming data stream. In one embodiment, the structured literal may have one or more variables, which may be bound to the value if the first pattern matches the value. In another embodiment, the programming language may have a second pattern defined in an object-oriented programming language. The second pattern may be a structured literal and may be checked against the value if the first pattern does not match the value.

The computer-readable medium and method may include defining a first pattern in an object-oriented programming language and determining whether the first pattern matches a value contained in an incoming data stream. In one embodiment, the first pattern may be a structured literal with one or more variables. The variables may be bound to the value if the first pattern matches the value. In another embodiment, the computer-readable medium and method may include defining a guard expression and statement block, evaluating the guard expression, and executing the statement block if the guard expression evaluates to true.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the invention is not limited to the specific methods and instrumentalities disclosed.

DETAILED DESCRIPTION

Figure 1A:
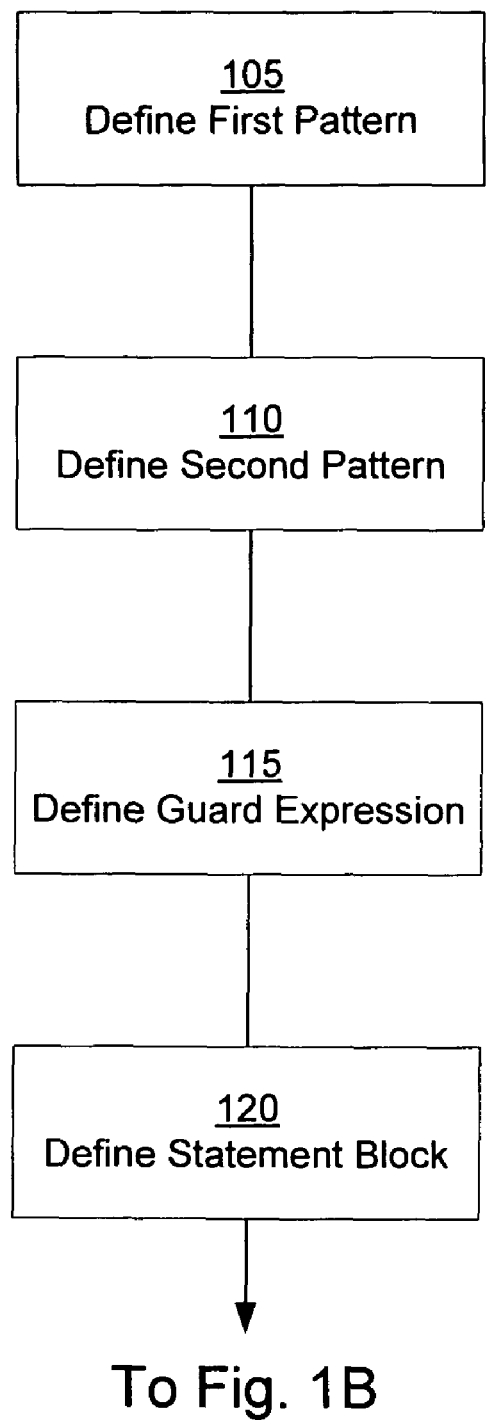
FIGS. 1A and 1B are flow diagrams illustrating an example method for pattern matching via structured literals.

The inventive subject matter is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

Pattern matching may use a syntax similar to the construction of values for deconstructing structured values and binding constituent values to variables. A pattern may be syntactically similar to a literal except that it may appear in a variable binding position, or in a expression list position of a switch statement. The leaves of the pattern may contain variable declarations that are bound when the pattern matches. Pattern matching has been popular in functional and logic programming languages because it facilitates the creation of concise programs that are capable of manipulating complex data structures. Now that object-oriented languages, such as C# and Visual Basic, have literals for structured types, it has become possible to incorporate pattern matching capabilities to object-oriented languages as well.

Pattern matching may make data-processing code cleaner, shorter, and more concise by making forms that bind variables resemble the data syntactically, as well as structurally. Consider the following example switch statement for analyzing the sub-properties of country data:

```
Select Case propertyName
    Case "religions", "ethnicgroups", "languages"
        Dim pct As XAttribute = subprop.Attribute("percentage")
        ...
    Case "border"
        Dim cn As XAttribute = subprop.Attribute("country")
        Dim xa As XAttribute = subprop.Attribute("length")
        ...
    Case "city"
        Dim nym As XElement = subprop.Element("name")
        Dim lon As XElement = subprop.Element("longitude")
        Dim lat As XElement = subprop.Element("latitude")
        Dim pop As XElement = subprop.Element("population")
        ...
    Case "province"
        Dim nym As XElement = subprop.Element("name")
        Dim area As XElement = subprop.Element("area")
        Dim pop As XElement = subprop.Element("population")
        ...
    Case Else
        ...
End Select
```

EXAMPLE STATEMENT A

Statement A may be rewritten in a cleaner, shorter, more concise form in which the variable-binding code is in the form of a structured literal, using enclosed expression syntax to bind variables. For example, using XML literals, Statement A may be rewritten as follows:

```
Select Case propertyName
    Case <religions    percentage=pct><%= Dim gname%></religions>,
         <ethnicgroups percentage=pct><%= Dim gname%></ethnicgroups>,
         <languages    percentage=pct><%= Dim gname%></languages>,
        ...
    Case <border country=cn length=xa/>
        ...
    Case <city><name><%=Dim nym%></name>
         <longitude>  <%=Dim lon%></longitude>
         <latitude>   <%=Dim lat%></latitude>
         <population> <%=Dim pop%></population></city>
        ...
    Case <province><name><%=Dim nym%> </name>
         <area><%=Dim area%></area>
         <population><%=Dim pop%> </population></province>
        ...
    Case Else
        ...
End Select
```

EXAMPLE STATEMENT B

In another example, the following switch statement may match an Email message. The first arm succeeds when the To element matches Erik, while the second branch succeeds when the From child matches Brian:

```
Select Case msg
    Case <Email>
            <From><%= Dim From %></From>
            <To>Erik</To>
            <Subject><%= Dim Subject %></Subject>
            <Body><%= Dim Body %></Body>
         </Email>
        ... message sent to Erik ...
    Case <Email>
            <From>Brian</From>
            <To><%= Dim To %></To>
            <Subject><%= Dim Subject %></Subject>
            <Body><%= Dim Body %></Body>
         </Email>
        ... message from Brian ...
    Case <Letter><%= Dim Text %></Letter>
        ... a letter ..
End Select
```

EXAMPLE STATEMENT C

In the first branch the variables From, Subject, and Body are in scope and are bound to the content of the respective elements. Similarly in the second arm the variables To, Subject and Body are in scope. The third branch matches a <Letter> element and binds its content to the variable Text.

The implementation of Statement C may be complex since each arm may be translated into code that checks whether the actual shape of the msg variable matches the pattern and then bind the respective variables to the correct child elements. The approximate translation of Statement C may be as follows:

```
If msg.Name( ) = "Email" AndAlso msg.To.Value( ) = "Erik"
    REM check shape
    REM bind variables
    Dim From = msg.From.Content( )
    Dim Subject = msg.Subject.Content( )
    Dim Body = msg.Body.Content( )
    REM execute arm
    ... message sent to Erik ..
Else If msg.Name( ) = "Email" AndAlso msg.From.Value( ) = "Brian"
    Dim To = msg.To.Content( )
    Dim Subject = msg.Subject.Content( )
    Dim Body = msg.Body.Content( )
    ... message sent to Erik ...
Else If msg.Name( ) = "Letter"
    Dim Text = msg.Letter.Content( )
    ... a letter ...
End If
```

EXAMPLE STATEMENT D

The actual translation can be optimized to avoid repeated checking of overlapping shapes by factoring out common checks and partially binding variables along the way. As further discussed below, example Statements C and D also suggest several possible extensions of a pattern matching construct using structured literals, such as XML literals, object literals, type literals, and the like.

The pattern matching construct may use a wildcard pattern, which may enable the construct to match a pattern without necessarily binding a variable to the value if there is a match. For example, the pattern matching construct may match on any Email message whose To child is Erik and bind the content of the message body, but ignore the rest of the message. In one embodiment, the wildcard pattern may be in the form <%> for zero or more children.

The pattern matching construct may also match use a variable that is associated with a nested pattern, thereby enabling the construct to match on a substructure yet bind the variable to the entire structure. For example, as illustrated in the example statement below, the construct may use an "as pattern" of the form <%=Pattern=Dim Z %>:

```
Select Case msg
    Case <Email>
        <%= <Header>
            <From><%= From %></From>
            <To><%= Dim To %></To>
            <Subject><%= Dim Subject %></Subject>
        </Header> = Dim Header
        %>
        <Body><%= Dim Body %></Body>
    </Email>
    . . . Header variable bound to Header element, From, To and
Subject variables bound to sub-elements of Header . . .
```

EXAMPLE STATEMENT E

The pattern matching construct may not be limited to "shallow" patterns (i.e., patterns that matches direct children of the parent nodes of the pattern) but rather may include a descendant pattern, which may match to a descendant element that is nested arbitrarily deep in the structure or tree. For example, the following statement binds the From variable to the content of the From node having a value that matches the pattern:

```
Select Case msg
    Case <Email>
        <From><%= Dim From %></From>
    </Email>
```

EXAMPLE STATEMENT F

The From node may be arbitrarily deep in the email message. For example, the email message may have the following structured value:

```
<Email>
    <Headers>
        <Senders>
            <From>Bill</From>
        </Senders>
    </Headers>
</Email>
```

EXAMPLE STATEMENT G

Statement F may incorporate a descendant pattern to facilitate matching without having to mention all intermediate nodes on the path. The descendant pattern may be in the form <%= . . . Pattern . . . %>. Thus, in one embodiment, Statement F may be rewritten as follows:

```
Select Case msg
    Case <Email>
        <% . . . <From><%= Dim F %> . . . %>
    </Email>
```

EXAMPLE STATEMENT H

Using the foregoing extensions, example Statement C may be rewritten as follows:

```
Select Case msg
    Case <Email>
        <%>
        <To>Erik</To>
        <%>
        <% Dim Body = <Body><%></Body> %>
    </Email>
    . . . message sent to Erik . . .
    Case <Email>
        <From>Brian</From>
        <%= . . . <B><%= Dim Bold %></B> . . .%>
    </Email>
    . . . message from Brian. . .
    Case <Letter><%= Dim Text %></Letter>
    . . . a letter. . .
End Select
```

EXAMPLE STATEMENT I

The pattern matching construct may have other extensions either in addition to, or lieu of, those discussed above. More specifically, the pattern matching construct may use guard expressions, or guards, which may be Boolean expressions in the arms of switch statements that enable additional tests to be performed once a match is found. If the guard evaluates to true, a statement block within the respective arm of the switch statement may be executed. If the guard evaluates to false, pattern matching may resume at the next arm of the enclosing switch statement. For example, a guard may be used to check that From and To are not bound to the same value:

```
Select Case Msg
    Case <Email>
        <From><%= Dim From %></From>
        <To><%= Dim To %></To>
    </Email>
    When From < > To
        . . . statement to be executed . . .
```

EXAMPLE STATEMENT J

The pattern matching construct may use irrefutable patterns, which may facilitate pattern matching in positions where variable declarations are allowed. In other words, irrefutable patterns may enable the construct to bind variables without having to switch on the value of the pattern. For example, given the following function:

```
Function F(X As Integer, Y As Integer) As {X As Integer, Y
As Integer}
    Return New {X, Y}
End Function
```

EXAMPLE STATEMENT K

The result of the function in Statement K may be assigned to a pattern declaration as follows:
New{Dim X, Dim Y}=F(2,3)

EXAMPLE STATEMENT L

The declaration in Statement L may be translated into the following assignment statements:
Dim R=F(2,3)
Dim Y=R.X
Dim Z=R.Y

EXAMPLE STATEMENT M

Thus, the declaration in Statement L may be translated into explicit access without conditional logic.

The pattern matching construct may also utilize type inferences with any defined variables, thereby facilitating clear, concise programs by eliminating the need to define the type for each variable defined in the pattern. For example, if the pattern has a structured value (x, y), a compiler may infer the types of variables x and y based on their position in the pattern.

It will be appreciated that foregoing examples are meant to illustrate various embodiments of the above extensions. Thus, alternate syntax may be used to implement the same or similar mechanisms while remaining consistent with an embodiment.

In addition to XML literals, the pattern matching construct may use other forms of literals, such as object literals, type literals and code literals. Pattern matching on object literals is similar to pattern matching on XML literals, except that object literals may not support descendant patterns since there is no corresponding direct accessor, and that the order in which members appear in object literals is irrelevant.

In the following example, the first arm binds the Name and Street of customers in Seattle, while the second arm matches any customer whose Name starts with "A" or "B":

```
Class Customer
    Name As String
    Age As Integer
    Address As Address
End Class
Class Address
    Street As String
    City As String
    Zip As String
End Address
Dim C As Customer
Select Case C
    Case New Customer With {
      Dim Name,
      .Address = New Address With{ Dim Street, City = "Seattle" }
    }
      ... Name and Street in scope ..
    Case New Customer With { Dim Name }
      If Name.StartsWith("A")
        ... Name in scope, guarded by Name.StartsWith("A") ...
      Else If Name.StartsWith("B")
        ... Name in scope, guarded by Name.StartsWith("B") ...
      End If
End Select
```

EXAMPLE STATEMENT N

The following is an example statement that uses type literals:

```
Select Case C
    Case List (Of #T)
        ... C has type List(Of Type) for some type Type that is bound
          to type varaiable T ...
    Case HashTable(Of#K, Integer)
        ... C has type HashTable(Of Type, Integer) for some type Type
          that is bound to type variable K ...
End Select
```

EXAMPLE STATEMENT O

The example below illustrates a statement incorporating code literals. The statement uses ⌈ ... code literal ... ⌉ for quote and ⌊ ... embedded expression ... ⌋ for unquote:

```
Select Case Program
    Case [If ⌊Dim Expr⌋
            ⌊Dim ThenBranch⌋
          Else
            ⌊Dim ElseBranch⌋
          End If]
        ... deal with conditional ...
    Case [while ⌊Dim Expr⌋
            ⌊Dim Body⌋
          Next]
        ... deal with while statement ...
End Select
```

EXAMPLE STATEMENT P

Figure 1B:
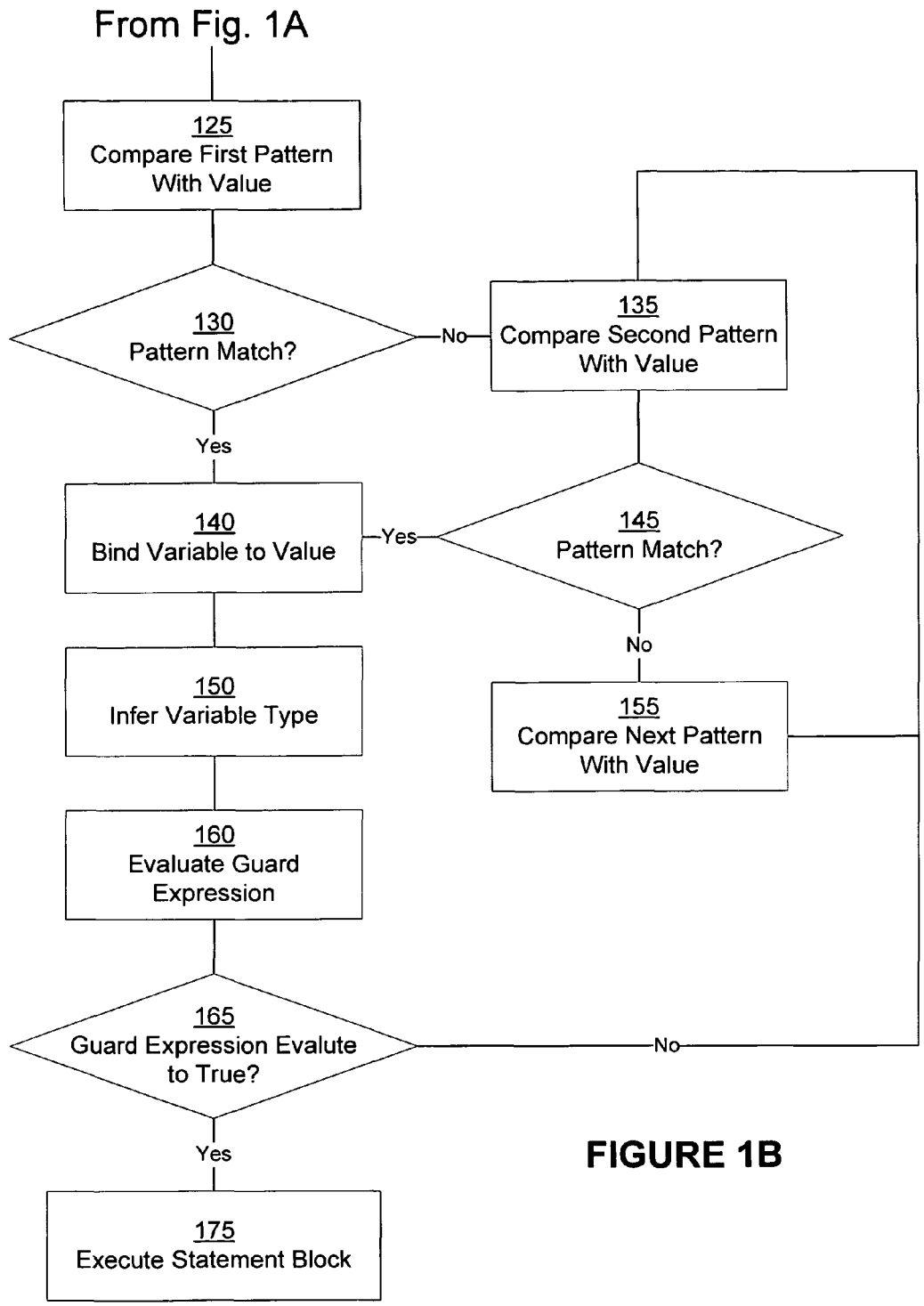

FIGS. 1A and 1B are flow diagrams illustrating an example method for pattern matching via structured literals. As shown in FIG. 1A, at 105 and 110, a first pattern and a second pattern may be defined, respectively. The first and second patterns may be defined in an object-oriented programming language (e.g., Visual Basic, C#, etc.) and may be structured literals, such as XML literals, object literals, type literals, code literals, and the like. The structured literals may include one or more atomic values, structured values, and/or variables. Each variable may be associated with a nested pattern. At 115 and 120, a guard expression and a statement block may be defined, respectively. The guard expression and/or statement block may be associated with the first pattern, the second pattern, or both.

As shown in FIG. 1B, at 125, the first pattern may be compared to a value contained in an incoming data stream. At 130, it may be determined whether the first pattern matches the value in the incoming data stream. If there is a pattern match, the process may proceed to 140. If the first pattern does not match the value, the process may proceed to 135. At 135, the second pattern may be compared to the value. At 145, it may be determined whether the second pattern matches the value. If there is a pattern match, the process may proceed to 140. If the second pattern does not match the incoming data pattern, the process may proceed to 155 where another pattern (i.e., a third pattern) may be compared to the value. This process may be repeated until a pattern match is found or until there are no remaining patterns to check. It will be appreciated that the defined patterns may have structured and/or non-structured values.

At 140, any variable that is defined in the first or second patterns may be bound to the value contained in the incoming data stream. At 150, a type of the variable may be inferred based on the position of the variable in the first or second patterns. For example, if the value represents an integer, such as 1234, a primitive type may be inferred. At 160, the guard expression may be evaluated. At 165, it may be determined whether the guard expression evaluates to true. If the guard expression evaluates to false, the process may return to 135 or 155 depending upon whether the second pattern was already checked. If the guard expression evaluates to true, the process may proceed to 175. At 175, the statement block may be executed.

It will be appreciated that the number and/or sequence of steps described above may be varied while remaining consistent with an embodiment. For example, in one embodiment, the type of the variable may be inferred at 150 before the variable is bound to the value at 140. In another embodiment, the first or second pattern may not contain a variable and, therefore, steps 140 and 150 may be omitted. In yet another embodiment, a guard expression may not be defined. Thus, steps 115, 160 and 165 may be omitted. Accordingly, the inventors have contemplated that the claimed subject matter might be embodied in other ways, to include different steps and/or combinations of steps.

Figure 2:
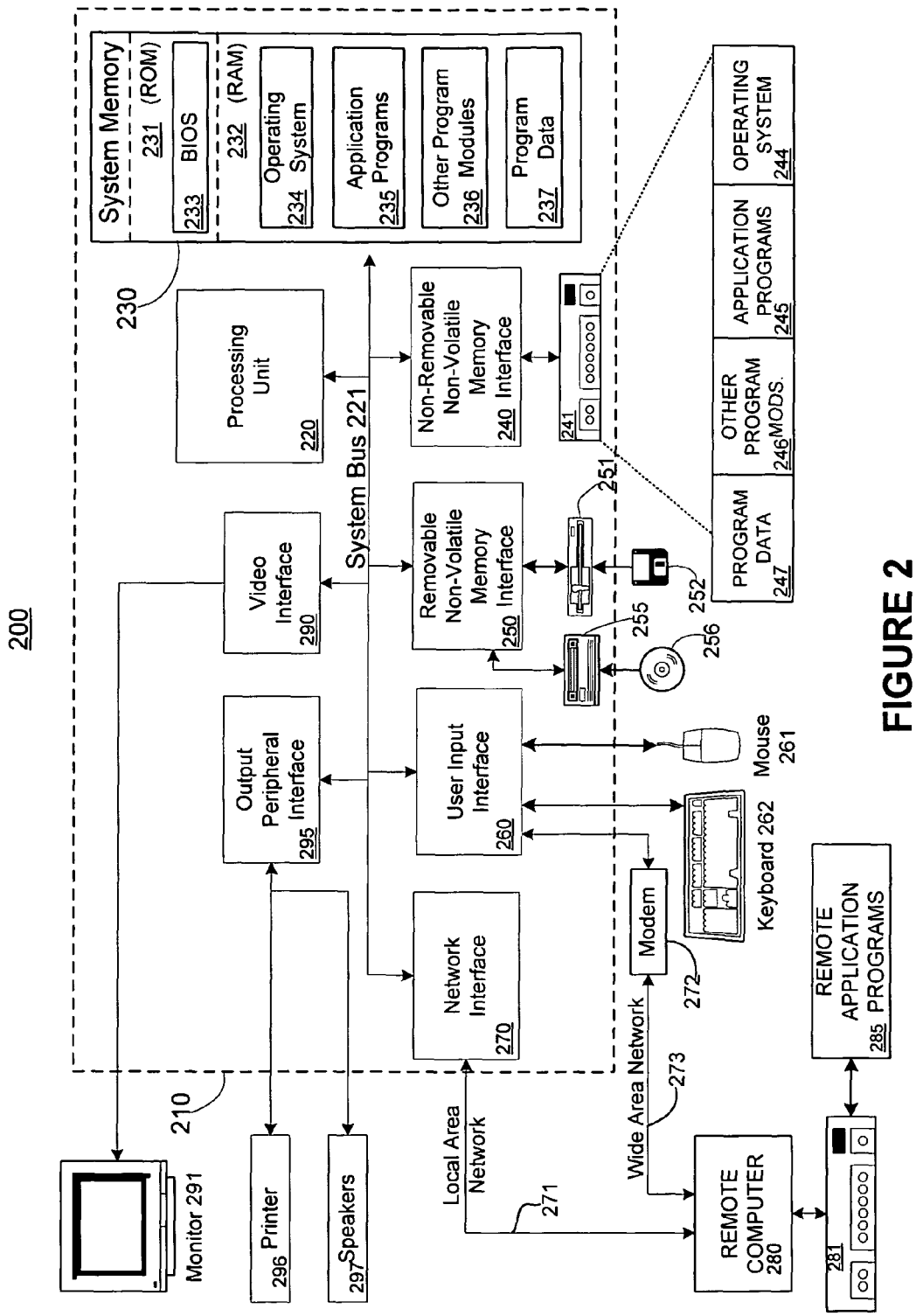
FIG. 2 is illustrates a suitable computing system environment in which embodiments of the invention may be implemented.

FIG. 2 and the following discussion are intended to provide a brief general description of a suitable computing environment in which an example embodiment of the invention may be implemented. It should be understood, however, that handheld, portable, and other computing devices of all kinds are contemplated for use in connection with the present invention. While a general purpose computer is described below, this is but one example. The present invention also may be operable on a thin client having network server interoperability and interaction. Thus, an example embodiment of the invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer or tester, and/or included within the network browsing software which will be described in the general context of computer-executable instructions, such as program modules, being executed by one or more computers (e.g., client workstations, servers, or other devices). Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. An embodiment of the invention may also be practiced in distributed computing environments where tasks are performed by remote processing devices that are linked through a communications network or other data transmission medium. In a distributed computing environment, program modules may be located in both local and remote computer storage media including memory storage devices.

FIG. 2 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 2, an example system 200 for implementing the invention includes a general purpose computing device in the form of a computer 210. Components of computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 210 typically includes a variety of computer readable media. Computer readable media can be any available media that can be accessed by computer 210 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer 210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of computer readable media.

The system memory 230 includes computer storage media in the form of volatile and/or nonvolatile memory such as ROM 231 and RAM 232. A basic input/output system 233 (BIOS), containing the basic routines that help to transfer information between elements within computer 210, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237. RAM 232 may contain other data and/or program modules.

The computer 210 may also include other removable/non-removable, volatile/nonvolatile computer storage media. By way of example only, FIG. 2 illustrates a hard disk drive 241 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2 provide storage of computer readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 210 through input devices such as a keyboard 262 and pointing device 261, commonly referred to as a mouse, trackball or touch pad. Other input devices (not shown) may include a microphone, joystick, game pad, satellite dish, scanner, or the like. These and other input devices are often connected to the processing unit 220a-f through a user input interface 260 that is coupled to the system bus 221, but may be connected by other interface and bus structures, such as a parallel port, game port or a universal serial bus (USB).

A monitor 291 or other type of display device is also connected to the system bus 221 via an interface, such as a video interface 290. In addition to monitor 291, computers may also include other peripheral output devices such as speakers 297 and printer 296, which may be connected through an output peripheral interface 295.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are exemplary and other means of establishing a communications link between the computers may be used.

One of ordinary skill in the art can appreciate that a computer 210 or other client devices can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

What is claimed:

1. A system for programming a computer for pattern matching; the system comprising:
    a processor; and
    a memory coupled to the processor, the memory having stored thereon instructions that when executed by the processor cause the processor to:
        define a first pattern in an object-oriented programming language, the first pattern being a structured literal that is capable of matching a value contained in an incoming data stream, the structured literal comprising a representation of a list, tree, object, or graph;
        compare the first pattern to the value in the incoming data stream;
        determine that one or more variables are defined in the first pattern;
        infer the type of the one or more variables based on the position of the one or more variables in the first pattern;
        bound the one or more variables to the value;
        define a guard expression to be associated with the first pattern; and
        evaluate the guard expression,
    wherein if the first pattern matches the value, the guard expression evaluates to true; and if the first pattern does not match the value, the guard expression evaluates to false and a second pattern is compare to the value in the incoming data stream to determine whether the second pattern matches the value.

2. The system of claim 1, wherein the structured literal is one of an XML literal, an object literal, a type literal, and a code literal.

3. The system of claim 1, wherein the variable is associated with a nested pattern.

4. The system of claim 1, wherein the variable is bound to the value if the first pattern matches the value.

5. The system of claim 1, wherein the memory has further stored thereon instructions that when executed by the processor cause the processor to define a statement block; determine that the first pattern matches the value; and in response to determining that the first pattern matches the value, execute the statement block.

6. The system of claim 1, wherein the first pattern comprises at least one of a wildcard pattern, an irrefutable pattern, and a descendant pattern.

7. A method for pattern matching, comprising:
- defining by a process executing on a processor, a first pattern in an object-oriented programming language, wherein the first pattern is a structured literal, the structured literal comprising a representation of a list, tree, object, or graph;
- determining by the process executing on the processor, whether the first pattern matches a value contained in an incoming data stream;
- comparing by the process executing on the processor, the first pattern to the value in the incoming data stream;
- determining by the process executing on the processor that the structured literal comprises a variable and that one or more variables are defined in the first pattern;
- inferring by the process executing on the processor the type of the one or more variables based on the position of the one or more variables in the first pattern; and
- bounding by the process executing on the processor the one or more variables to the value;
- defining a guard expression to be associated with the first pattern;
- defining a statement block of the guard expression;
- defining a second pattern in an object-oriented programming language, wherein the second pattern is a structured literal;
- evaluating the guard expression;
- executing the statement block if the first pattern matches the value and the guard expression evaluates to true; and
- comparing the second pattern to the value to determine whether the second pattern matches the value if the first pattern matches the value and the guard expression evaluates to false.

8. A computer-readable storage medium having stored thereon computer-executable instructions for performing a method of pattern matching, the method comprising:
- defining a first pattern in an object-oriented programming language, wherein the first pattern is a structured literal having a first variable, the structured literal comprising a representation of a list, tree, object, or graph;
- determining whether the first pattern matches a value contained in an incoming data stream;
- comparing by the process executing on the processor, the first pattern to the value in the incoming data stream;
- determining by the process executing on the processor that the structured literal comprises a variable and that one or more variables are defined in the first pattern;
- inferring by the process executing on the processor the type of the one or more variables based on the position of the one or more variables in the first pattern;
- bounding by the process executing on the processor the one or more variables to the value;
- defining a guard expression to be associated with the first pattern;
- defining a statement block of the guard expression;
- evaluating the guard expression;
- executing the statement block;
- defining a second pattern in the object-oriented language, wherein the second pattern is a structured literal having a second variable; determining whether the second pattern matches the value; and binding the second variable to the value.

\* \* \* \* \*